United States Patent
Borjeson et al.

(10) Patent No.: US 9,685,156 B2
(45) Date of Patent: Jun. 20, 2017

(54) LOW-POWER VOICE COMMAND DETECTOR

(71) Applicant: Sony Corporation, Tokyo (JP)

(72) Inventors: Henrik Borjeson, Lund (SE); Magnus Abrahamsson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/656,079

(22) Filed: Mar. 12, 2015

(65) Prior Publication Data

US 2016/0267908 A1    Sep. 15, 2016

(51) Int. Cl.
G10L 15/22    (2006.01)
G10L 25/84    (2013.01)
G10L 25/78    (2013.01)

(52) U.S. Cl.
CPC .............. *G10L 15/22* (2013.01); *G10L 25/78* (2013.01); *G10L 25/84* (2013.01); *G10L 2015/223* (2013.01); *G10L 2025/786* (2013.01)

(58) Field of Classification Search
CPC ............... G10L 25/78; G10L 2025/783; G10L 2025/786
See application file for complete search history.

(56) References Cited

U.S. PATENT DOCUMENTS

| | | | | |
|---|---|---|---|---|
| 5,991,718 A | * | 11/1999 | Malah | G10L 25/78 704/208 |
| 6,154,721 A | * | 11/2000 | Sonnic | G10L 25/78 704/213 |
| 8,990,079 B1 | * | 3/2015 | Newman | G10L 15/22 704/214 |
| 2004/0128137 A1 | * | 7/2004 | Bush | G10L 15/26 704/275 |
| 2006/0217976 A1 | * | 9/2006 | Gao | G10L 25/78 704/214 |
| 2007/0110263 A1 | * | 5/2007 | Brox | G10L 25/78 381/110 |
| 2007/0271093 A1 | * | 11/2007 | Wang | G10L 25/78 704/210 |
| 2008/0260180 A1 | * | 10/2008 | Goldstein | H04R 25/50 381/110 |
| 2009/0089053 A1 | * | 4/2009 | Wang | G10L 25/78 704/233 |

(Continued)

OTHER PUBLICATIONS

International Search Report and Written Opinion dated Apr. 1, 2016 for corresponding International Application No. PCT/IB2016/050068.

*Primary Examiner* — Douglas Godbold
(74) *Attorney, Agent, or Firm* — Renner, Otto, Boiselle & Sklar LLP (57) ABSTRACT

A low-power voice command detection method uses an audio monitoring device to capture sound. The captured sound is analyzed in steps to determine if it fulfills a number of criteria regarding sound level, voice content and identifiable voice commands. For each step the processing is more complex and power demanding. A threshold between the first and subsequent steps is used to gate further processing. This threshold is dynamically adjusted, based on the outcome of the analysis, to avoid unnecessary processing and increase system performance.

18 Claims, 3 Drawing Sheets

(56) References Cited

U.S. PATENT DOCUMENTS

| | | | |
|---|---|---|---|
| 2011/0106533 A1* | 5/2011 | Yu | G10L 25/78 704/233 |
| 2011/0202339 A1* | 8/2011 | Emori | G10L 25/78 704/231 |
| 2011/0231186 A1 | 9/2011 | Lin | |
| 2011/0288864 A1* | 11/2011 | Kechichian | G10L 25/78 704/237 |
| 2012/0059648 A1* | 3/2012 | Burnett | G10L 21/02 704/226 |
| 2012/0130713 A1 | 5/2012 | Shin | |
| 2013/0054236 A1 | 2/2013 | Garcia | |
| 2013/0080168 A1* | 3/2013 | Iida | G10L 25/51 704/246 |
| 2014/0088966 A1* | 3/2014 | Harada | G10L 25/78 704/246 |
| 2014/0095157 A1* | 4/2014 | Usher | H04R 25/50 704/233 |
| 2014/0278437 A1* | 9/2014 | Shen | G10L 21/06 704/275 |
| 2014/0297287 A1 | 10/2014 | Newman | |
| 2014/0358552 A1* | 12/2014 | Xu | G06F 1/3234 704/275 |
| 2015/0221322 A1* | 8/2015 | Iyengar | G10L 25/84 704/226 |
| 2015/0341006 A1* | 11/2015 | Jiang | H03G 3/20 381/107 |
| 2015/0371638 A1* | 12/2015 | Ma | G10L 15/28 704/275 |

\* cited by examiner

LOW-POWER VOICE COMMAND DETECTOR

TECHNICAL FIELD OF THE INVENTION

The technology of the present disclosure relates generally to electronic devices and, more particularly, to an apparatus and method for detecting voice commands while minimizing power consumption.

BACKGROUND

Electronic devices, such as mobile phones, cameras, music players, notepads, etc., are becoming increasingly popular. For example, mobile telephones, in addition to providing a means for communicating with others, provide a number of other features, such as text messaging, email, camera functions, the ability to execute applications, etc.

A popular feature of electronic devices, such as mobile telephones, is their ability to recognize speech and perform actions based on the recognized speech. Preferably, such speech recognition functionality is always enabled, constantly listening for voice commands. A problem with such approach, however, is that conventional methodologies for determining and interpreting voice commands are very power consuming. This has led to solutions where the speech recognition functionality is typically disabled, and when a voice control is desired speech recognition functionality is manually enabled by the user. For example, by starting an application (e.g., GoogleNow) or pushing a button (e.g., Sony Smartband Talk).

For more intelligent systems (NLU, Natural Language Understanding) which are computationally intensive and preferably performed as a cloud service (e.g., GoogleNow,), it is common to have a first gating with a "key word" that can be detected without enabling full functionality. Examples of this include "OK Google" in the Google Now service. However, even the key word recognition consumes significant power and thus is not always enabled.

SUMMARY

A device and method in accordance with the present disclosure provide low-power speech recognition that does not require active input from a user to enable the speech recognition functionality. More particularly, a first low-power stage, which may be continuously enabled (always on), is used to determine if sounds may or may not be speech. If it is determined that the sounds may be speech, then a second stage and possibly a third stage are enabled to further analyze the detected sound to determine if a voice command is included in the sound.

In the first stage sound below a dynamically-set threshold level is discarded, without performing any analysis of the sound. The processing power associated with monitoring sound levels is relatively low and thus consumes minimal electrical power. Further, by dynamically setting the threshold in accordance with a novel aspect of the invention, accuracy can be improved while expending minimal power. If the sound level exceeds the dynamically-set threshold, then the second stage is enabled to determine if the sound contains speech or is simply ambient noise. The second stage may be more power intensive than the first stage, but can be less power intensive than the third stage. The third stage, which includes the actual speech interpretation, requires a higher amount of computing power relative to the first and second stages and can be executed either local or remote, e.g., performed as a cloud service.

When receiving the result of the interpretation, several parameters in the mobile device are then updated in order to better distinguish if and how the second and third processing step, with its respective power drain from the battery, shall be performed on future detections.

In accordance with one aspect of the invention, an electronic device includes: an audio module for capturing ambient sound; a voice command detection module for determining voice commands provided by a user, the voice command detection module configured to analyze sound that is captured by the audio module and that exceeds a first sound threshold level for the presence of speech or ambient noise, and dynamically adjust the first sound threshold level based on the analysis of the captured sound.

In accordance with one aspect of the invention, a method for detecting voice commands includes: using an audio module to capture sound; analyzing sound captured by the audio module that exceeds a first sound threshold level for the presence of speech or ambient noise in the captured sound; and dynamically adjusting the first sound threshold level based on the analysis of the captured sound.

To the accomplishment of the foregoing and the related ends, the device and method comprises the features hereinafter fully described in the specification and particularly pointed out in the claims, the following description and the annexed drawings setting forth in detail certain illustrative embodiments, these being indicative, however, of but several of the various ways in which the principles of the invention may be suitably employed.

Although the various features are described and are illustrated in respective drawings/embodiments, it will be appreciated that features of a given drawing or embodiment may be used in one or more other drawings or embodiments of the invention.

DETAILED DESCRIPTION OF EMBODIMENTS

Embodiments will now be described with reference to the drawings, wherein like reference numerals are used to refer to like elements throughout. It will be understood that the figures are not necessarily to scale. Additionally, features that are described and/or illustrated with respect to one embodiment may be used in the same way or in a similar way in one or more other embodiments and/or in combination with or instead of the features of the other embodiments.

Described below in conjunction with the appended figures are various embodiments of an apparatus and a method for providing low-power speech recognition. While embodiments in accordance with the present disclosure relate, in general, to the field of electronic devices, for the sake of clarity and simplicity most embodiments outlined in this specification are described in the context of mobile phones. It should be appreciated, however, that features described in the context of mobile phones are also applicable to other electronic devices. Therefore, the techniques described in this document may be applied to any type of appropriate electronic device enabled for sound detection or voice control, examples of which include a mobile telephone, a media player, a gaming device, a computer, a pager, a communicator, an electronic organizer, a personal digital assistant (PDA), a smartphone, a portable communication apparatus, etc.

In accordance with the present disclosure, speech recognition functionality may be continuously active while minimizing power consumption. For example, a first step is always active, where the first step is very power efficient. When the likelihood is high that the received audio is a speech command, subsequent steps are enabled to determine if words are present in the received audio and to determine if those words correspond to a keyword. Further, an adaptive algorithm adjusts detection thresholds used for the detection of sound and/or speech, the adjustment based, for example, on word recognition hit/miss rate of the detected audio, and/or the signal to noise ratio when a word hit is detected. Further details regarding the speech recognition method are described below with respect to FIGS. 3-5.

Figure 1:
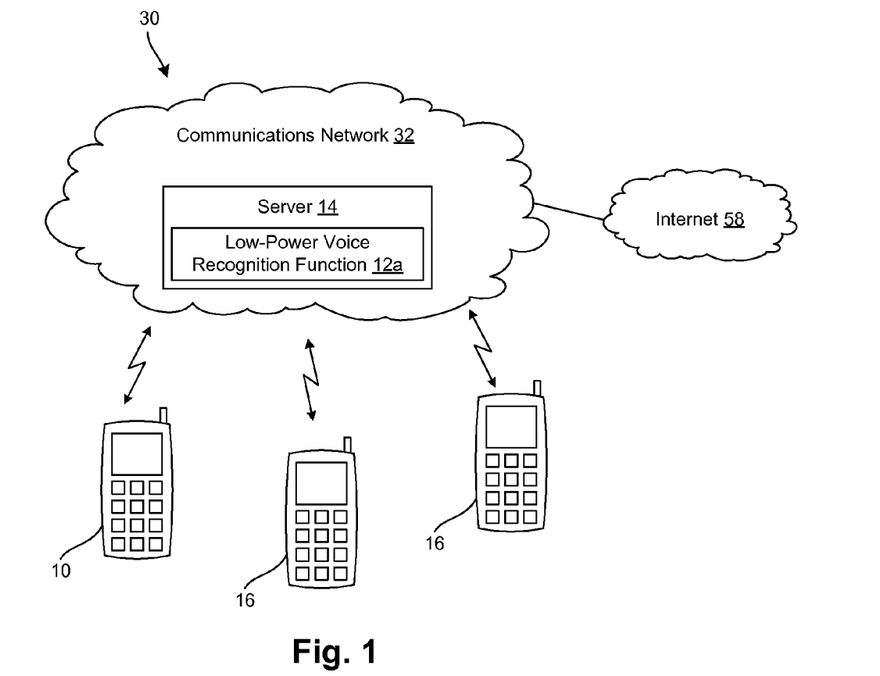
FIG. 1 is a schematic diagram illustrating a system that may implement a low-power speech recognition function in accordance with the present disclosure.
Figure 2:
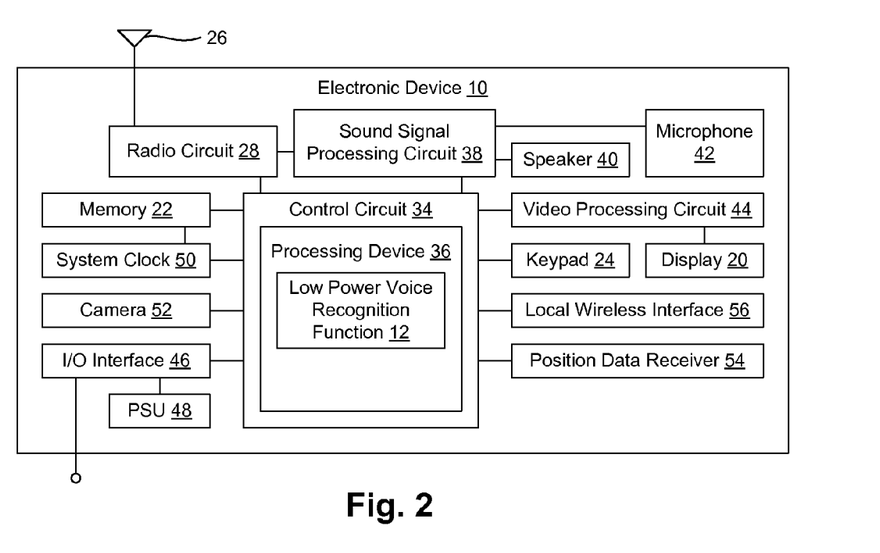
FIG. 2 is a schematic block diagram of modules of an electronic device that implements low-power speech recognition in accordance with the present disclosure.

Referring initially to FIGS. 1 and 2, an electronic device 10 is shown. In one embodiment the electronic device 10 includes at least a portion of a low-power speech recognition function 12 that is configured to continuously monitor the ambient environment and distinguish voice commands from the ambient noise while expending minimal power. In another embodiment the electronic device 10 may operatively communicate with a server 14, the server 14 including at least a portion 12a of the low-power speech recognition function 12 to process ambient sound data collected by the electronic device (the remaining portion of the low-power speech recognition function 12 would be executed in the electronic device 10).

Additional details and operation of the low-power speech recognition function 12 will be described in greater detail below. The low-power speech recognition function 12 may be embodied at least partially as executable code that is resident in and executed by the electronic device 10 and/or server 14. In one embodiment, the low-power speech recognition function 12 may be one or more programs that are stored on a computer or machine readable medium. The low-power speech recognition function 12 may be a stand-alone software application or form a part of a software application that carries out additional tasks related to the electronic device 10.

Through the following description, exemplary techniques for continuously monitoring for voice commands while expending minimum power are described. It will be appreciated that through the description of the exemplary techniques, a description of steps that may be carried out in part by executing software is described. The described steps are the foundation from which a programmer of ordinary skill in the art may write code to implement the described functionality. As such, a computer program listing is omitted for the sake of brevity. However, the described steps may be considered a method that the corresponding device is configured to carry out. Also, while the low-power speech recognition function 12 may be implemented in software in accordance with an embodiment, such functionality could also be carried out via dedicated hardware or firmware, or some combination of hardware, firmware and/or software.

The electronic device 10 may include a display 20. The display 20 displays information to a user such as operating state, time, telephone numbers, contact information, various menus, etc., that enable the user to utilize the various features of the electronic device 10. The display 20 also may be used to visually display content received by the electronic device 10 and/or retrieved from a memory 22 of the electronic device 10. The display 20 may be used to present images, video and other graphics to the user, such as photographs, mobile television content, Internet pages, and video associated with games.

A keypad 24 provides for a variety of user input operations. For example, the keypad 24 may include alphanumeric keys for allowing entry of alphanumeric information (e.g., telephone numbers, phone lists, contact information, notes, text, etc.), special function keys (e.g., a call send and answer key, multimedia playback control keys, a camera shutter button, etc.), navigation and select keys or a pointing device, and so forth. Keys or key-like functionality also may be embodied as a touch screen associated with the display 20. Also, the display 20 and keypad 24 may be used in conjunction with one another to implement soft key functionality.

The electronic device 10 includes communications circuitry that enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network (e.g., a network compatible with IEEE 802.11, which is commonly referred to as WiFi, or a network compatible with IEEE 802.16, which is commonly referred to as WiMAX), for example. Data transfers may include, but are not limited to, receiving streaming content (e.g., streaming audio, streaming video, etc.), receiving data feeds (e.g., pushed data, podcasts, really simple syndication (RSS) data feeds data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in the memory 22, executing applications to allow user interaction with the data, displaying video and/or image content associated with the data, outputting audio sounds associated with the data, and so forth.

In the exemplary embodiment, the communications circuitry may include an antenna 26 coupled to a radio circuit 28. The radio circuit 28 includes a radio frequency transmitter and receiver for transmitting and receiving signals via the antenna 26.

The radio circuit 28 may be configured to operate in a mobile communications system 30 (FIG. 1). Radio circuit 28 types for interaction with a mobile radio network and/or broadcasting network include, but are not limited to, global system for mobile communications (GSM), code division multiple access (CDMA), wideband CDMA (WCDMA), general packet radio service (GPRS), WiFi, Bluetooth, WiMAX, digital video broadcasting-handheld (DVB-H), integrated services digital broadcasting (ISDB), high speed packet access (HSPA), etc., as well as advanced versions of these standards or any other appropriate standard. It will be appreciated that the electronic device 10 may be capable of communicating using more than one standard. Therefore, the antenna 26 and the radio circuit 28 may represent one or more than one radio transceiver.

The system 30 may include a communications network 32 having the server 14 (or servers) for managing calls placed by and destined to the electronic device 10, transmitting data to and receiving data from the electronic device 10 and carrying out any other support functions. The server 14 communicates with the electronic device 10 via a transmission medium. The transmission medium may be any appropriate device or assembly, including, for example, a communications base station (e.g., a cellular service tower, or "cell" tower), a wireless access point, a satellite, etc. The network 32 may support the communications activity of multiple electronic devices 10, 16 and other types of end user devices. As will be appreciated, the server 14 may be configured as a typical computer system used to carry out server functions and may include a processor configured to execute software containing logical instructions that embody the functions of the server 14 and a memory to store such software and any related databases. In alternative arrangements, the electronic device 10 may wirelessly communicate directly with another electronic device 10 (e.g., another mobile telephone or a computer) and without an intervening network. As indicated, the server 14 may store and execute the low-power voice recognition function 12. In another embodiment, communications activity of the electronic devices 10, 16 may be managed by a server that is different from the server 14 that executes the low-power voice recognition function 12.

The electronic device 10 may include a primary control circuit 34 that is configured to carry out overall control of the functions and operations of the electronic device 10. The control circuit 34 may include a processing device 36, such as a central processing unit (CPU), microcontroller or microprocessor. The processing device 36 executes code stored in a memory (not shown) within the control circuit 34 and/or in a separate memory, such as the memory 22, in order to carry out operation of the electronic device 10. For instance, the processing device 36 may execute code that implements the low-power speech recognition function 12. The memory 22 may be, for example, one or more of a buffer, a flash memory, a hard drive, a removable media, a volatile memory, a non-volatile memory, a random access memory (RAM), or other suitable device. In a typical arrangement, the memory 22 may include a non-volatile memory for long term data storage and a volatile memory that functions as system memory for the control circuit 34. The memory 22 may exchange data with the control circuit 34 over a data bus. Accompanying control lines and an address bus between the memory 22 and the control circuit 34 also may be present.

The electronic device 10 further includes a sound signal processing circuit 38 for processing audio signals transmitted by and received from the radio circuit 28. Coupled to the sound processing circuit 38 are a speaker 40 and a microphone 42 that enable a user to listen and speak via the electronic device 10. In one embodiment microphone 42 comprises a single microphone, while in another embodiment microphone comprises a plurality of microphones, e.g., a first microphone (or first microphone array) located on a front side of the electronic device 10 and a second microphone (or second microphone array) located on a back side of the electronic device 10. The radio circuit 28 and sound processing circuit 38 are each coupled to the control circuit 34 so as to carry out overall operation. Audio data may be passed from the control circuit 34 to the sound signal processing circuit 38 for playback to the user. The audio data may include, for example, audio data from an audio file stored by the memory 22 and retrieved by the control circuit 34, or received audio data such as in the form of voice communications or streaming audio data from a mobile radio service. The sound processing circuit 38 may include any appropriate buffers, decoders, amplifiers and so forth.

The display 20 may be coupled to the control circuit 34 by a video processing circuit 44 that converts video data to a video signal used to drive the display 20. The video processing circuit 44 may include any appropriate buffers, decoders, video data processors and so forth. The video data may be generated by the control circuit 34, retrieved from a video file that is stored in the memory 22, derived from an incoming video data stream that is received by the radio circuit 28 or obtained by any other suitable method.

The electronic device 10 may further include one or more input/output (I/O) interface(s) 46. The I/O interface(s) 46 may be in the form of typical mobile telephone I/O interfaces and may include one or more electrical connectors. The I/O interfaces 46 may form one or more data ports for connecting the electronic device 10 to another device (e.g., a computer) or an accessory (e.g., a personal hands free (PHF) device) via a cable. Further, operating power may be received over the I/O interface(s) 46 and power to charge a battery of a power supply unit (PSU) 48 within the electronic device 10 may be received over the I/O interface(s) 46. The PSU 48 may supply power to operate the electronic device 10 in the absence of an external power source.

The electronic device 10 also may include various other components. For instance, a system clock 50 may clock components such as the control circuit 34 and the memory 22. A camera 52 may be present for taking digital pictures and/or movies. Image and/or video files corresponding to the pictures and/or movies may be stored in the memory 22. A position data receiver 54, such as a global positioning system (GPS) receiver, Galileo satellite system receiver or the like, may be involved in determining the position of the electronic device 10. A local wireless interface 56, such as an infrared transceiver and/or an RF transceiver (e.g., a Bluetooth chipset) may be used to establish communication with a nearby device, such as an accessory (e.g., a PHF device), another mobile radio terminal, a computer or another device.

Figure 3:
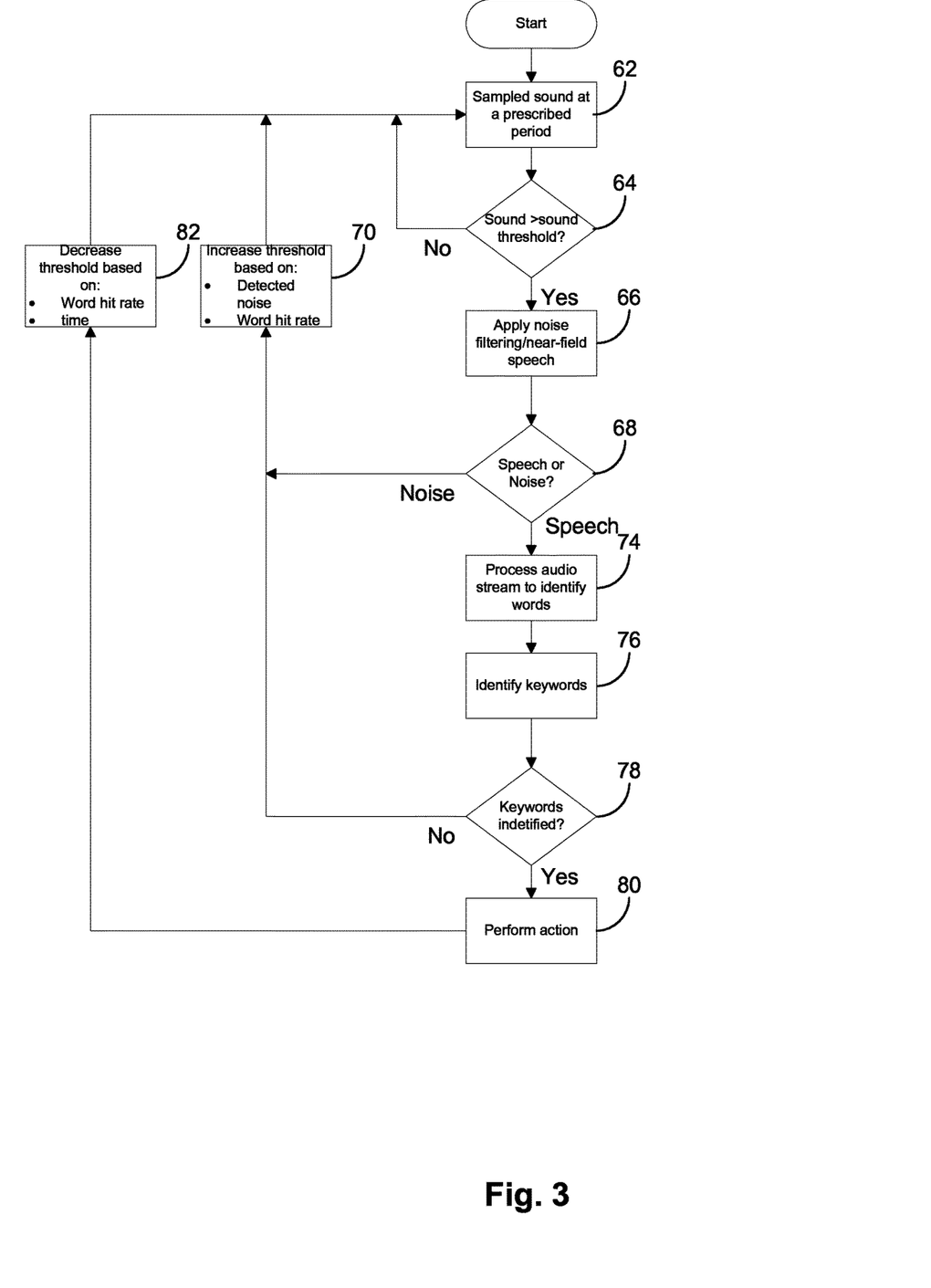
FIG. 3 is a flow chart illustrating exemplary steps for implementing low-power speech recognition in accordance with the present disclosure.

With additional reference to FIG. 3, illustrated are logical operations to implement an exemplary method of detecting voice commands with an electronic device while expending minimal power. The exemplary method may be carried out by executing an embodiment of the low-power speech recognition function 12, for example. Thus, the flow chart of FIG. 3 may be thought of as depicting steps of a method carried out by one of the electronic devices 10, 16. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted.

In one embodiment, voice command detection may be implemented only with portable electronic devices, such as mobile telephones and laptop computers. In another embodiment, voice command detection may be implemented only with certain types of portable electronic devices, such as mobile telephones. In still another embodiment, voice command detection may be made with both portable electronic devices and relatively stationary electronic devices, such as desktop computers, servers, or the like.

Regardless of device type, the logical flow for low-power detection of voice commands may begin in block 62 where an audio monitoring device, such as microphone 42 or other sound input means, captures the ambient sound. Preferably, digital audio capture methods are employed, although it will be appreciated that other methods, such as analog capture methods, etc., may be implemented without departing from the scope of the invention.

In accordance with the present disclosure, capture of the ambient sound is implemented continuously, without the need for a user to enable or disable capture functionality. Due to the low-power nature of the novel method in accordance with the present disclosure, power consumption is minimized and thus the "always active" feature has significantly less impact on battery life relative to conventional voice command detection methods. While in the preferred embodiment sound capture is always active (always on), in some instances users may wish for the feature to be disabled. In this regard, configuration settings can be provided to disable continuous capture, if desired. Alternatively or additionally, sound capture may be automatically enabled and disabled. For example, the electronic device may be configured to be context aware, such that the electronic device knows or can detect situations in which the likelihood of spoken commands is very low and thus disable sound capture, and determine when the likelihood of spoken commands is very high and thus enable sound capture. Such context awareness could for example include a method where sensors in the device, or external to the device, together with the time of day can determine when the user is sleeping.

Next, in step 64, the captured sound is compared to a sound threshold level (also referred to as a first sound threshold level) to determine if the captured sound is ambient noise or may contain speech. In this regard, it is determined if the captured sound exceeds the sound threshold level. The sound threshold level may correspond to an amplitude (intensity) of the sound, and may be expressed, for example, in terms of decibels. As will be described in more detail below, the sound threshold level is dynamically set, and may increase or decrease based on prescribed criteria.

If at step 64 the captured sound signal is not greater than the sound threshold level, then it can be concluded that the captured sound is merely ambient noise and thus the method moves back to step 62 and repeats. As used herein, ambient noise is defined as any sound in the environment of the electronic device 10 that is not user speech in the form of commands. Such ambient noise can include sounds associated with crowds (e.g., random conversations, footsteps, etc.), music, automobile sounds (e.g., engine noise, horns, etc.), train sounds (e.g., a train approaching or departing a station, etc.), public announcements, or any other non-user command sound in the general environment of the electronic device 10.

It is noted that after threshold updates a single person speaking may be regarded as noise. For example, if a user is sitting on a train and someone next to the user is talking to someone on their phone, the algorithm may initially trigger on the voice energy above the train noise. After several commands being processed and the hit rate decreasing, the level will be adjusted so even such input is disregarded.

With continued reference to step 64, if the captured sound signal is greater than the sound threshold level, then at steps 66 and 68 the signal is further analyzed to determine if speech is present in the captured sound. For example, in one embodiment filtering and/or frequency analysis may be performed on the captured sound signal. For example, the captured sound signal may be filtered by removing frequencies and sound energy corresponding to ambient noise, e.g., a band stop filter that removes low-frequency or high frequency sound, but allows the remaining signals to pass.

In another embodiment, the analysis of the captured sound signal is performed using sound samples obtained from two different microphones or microphone arrays, e.g., a microphone (or microphone array) located on a front side of the electronic device 10 and a microphone (or microphone array) located on a back side of the electronic device 10. The captured sound signal obtained from the first microphone (or first microphone array) then is compared to the captured sound signal obtained from the second microphone (or second microphone array) in order to determine if the sound signal includes user speech or is simply ambient noise. More specifically, if both captured sound signals exhibit substantially the same sound pressure and phase (a difference between the respective parameters is less than a corresponding first prescribed threshold), then it can be concluded that the captured sound signal is will not be a valid command and therefore does not need further processing. As will be appreciated, the first prescribed threshold may be adjusted based on the intended application of the electronic device. In one embodiment, the first prescribed threshold is 20 percent difference, and in another embodiment the first prescribed threshold is 10 percent difference. However, if the captured sound signal obtained from one of the microphones exhibits a sound pressure and/or phase that is substantially different from the sound signal obtained from the other microphone (a difference between the respective parameters exceeds a second prescribed threshold), then it can be concluded that the captured sound signal includes a user speech. Again, the values of the second prescribed threshold may be application specific. In one embodiment, the second prescribed threshold is 10 percent difference, and in another embodiment the second prescribed threshold is 20 percent difference or more.

If at step 68 the processed sound signal is determined to be substantially ambient noise, the method moves to block 70 where the sound threshold is increased by a prescribed value to minimize the capture of such ambient noise. For example, it may be concluded that the captured sound includes ambient noise when a noise component in the captured sound exceeds a prescribed percentage of the captured sound. In one embodiment, the prescribed percentage is 50 percent, and in another embodiment the prescribed percentage is 75 percent. As will be appreciated, the value of the prescribed percentage may be application specific. In addition to increasing the sound threshold level, and an optional adjust limit threshold level (also referred to as a second sound threshold level) is also increased by an amount corresponding to the increase in the sound threshold level. The adjust limit threshold level can be used to determine when the sound threshold level is properly set, as will be evident in the discussion of FIG. 4 below.

In one embodiment, the sound threshold level and the adjust limit threshold level are increased when a word hit rate of the sound signal exceeds a first prescribed threshold and the sound signal exceeds the sound threshold level. The sound threshold level and the adjust limit threshold level can be increased (and decreased) in proportion to one another.

Preferably, the proportional relationship is a one-to-one relationship. In one embodiment the prescribed value for increasing the sound threshold level and the adjust limit threshold level is based on a fixed value set within the firmware of the electronic device 10. In another embodiment the prescribed value is user tunable. For example, a configuration menu of the electronic device 10 may include a user-adjustable gain value corresponding to the sound threshold level adjustment. A user can adjust the gain value to provide optimum performance. In yet another embodiment, the prescribed value and/or gain value may be calculated within the electronic device 10 and/or by the server 14 based on one or more of the ambient noise, a learn procedure, frequency analysis, etc.

For example, the sound threshold level and the adjust limit threshold level may be increased based on a percentage of the current threshold level (e.g., 5%, 10%, 20%, etc.), or it may be a prescribed value added to the current threshold level (e.g., 0.5 dB, 1 dB, etc.). In one embodiment, the sound threshold level and the adjust limit threshold level are increased based on a word hit rate. For example, if the word hit rate of the captured sound is low, this indicates the system is capturing significant sound that is simply ambient noise. A correction value can be calculated based on the word hit rate and applied to the sound threshold level and to the adjust limit threshold level. In another embodiment, the sound threshold level and the adjust limit threshold level are increased based on the level of ambient noise detected in the captured sound. For example, if the captured sound is obtained from a crowded/noisy environment, the ambient noise may exceed the sound threshold level by a significant amount. To prevent this relative "loud" noise from being detected by the system, the sound threshold level and the adjust limit threshold level can be increased by an amount corresponding to the level (volume) of ambient noise.

Once the sound threshold level and the adjust limit threshold level have been adjusted, the method moves back to step 62 and repeats.

Moving back to block 72, if it is determined that the captured sound likely includes speech, then the method moves to step 74 where the captured sound is further processed to extract words from the captured audio. Extraction of words from audio data is well known in the art. Accordingly, details on such word extraction will not be described herein.

Once the words are extracted from the captured sound, at step 76 the detected words are analyzed to determine if they contain keywords. A keyword may be any word that is associated with a predefined command executable by the electronic device. Non-limiting examples of keywords include "find", "search", "call", "display", "play", etc. To determine if the detected words contain keywords, each detected word may be compared to words stored within a database or other storage means. For example, if the detected word is found to be stored in a keyword database and/or identified in the database as a keyword, then it can be concluded that the detected word is a keyword.

Moving to step 78, if a keyword is not identified, then the method moves to step 70, which was described above. However, if a keyword is identified, then the method moves to step 80 and the electronic device executes a command based on the keyword (e.g., initiates a call, plays a video, opens an email, etc.).

Next at step 82 the sound threshold level and the adjust limit threshold level are reevaluated to determine if the sound threshold level and the adjust limit threshold level should be decreased. In one embodiment the sound threshold level and adjust limit threshold level may be decreased when the captured sound exceeds the sound threshold level, includes or is likely to include speech, and is less than the adjust limit threshold level. In another embodiment, if the word hit rate is relatively low (e.g., less than a prescribed threshold level), this may indicate the sound threshold level is set too high and needs to be decreased. Similarly, if the time period between word hits is relatively high (e.g., greater than a prescribed threshold level), this also may indicate the sound threshold level is set too high.

If it is determined the sound threshold level and the adjust limit threshold level are set too high, then at block 82 the respective threshold levels may be decreased. The threshold levels may be decreased in a manner similar to that described with respect to increasing the threshold levels. For example, the sound threshold level and the adjust limit threshold level may be decreased based on a fixed value set within the firmware of the electronic device 10 (e.g., a fixed percentage of the current threshold, a fixed delta, etc.), a user adjustable gain, a calculation performed within the electronic device 10 and/or by the server 14 based on one or more of the ambient noise, a learn procedure, frequency analysis, a word hit rate, etc.

Upon the sound threshold level and the adjust limit threshold level being processed at step 82, the method moves back to step 62 and repeats.

Figure 4:
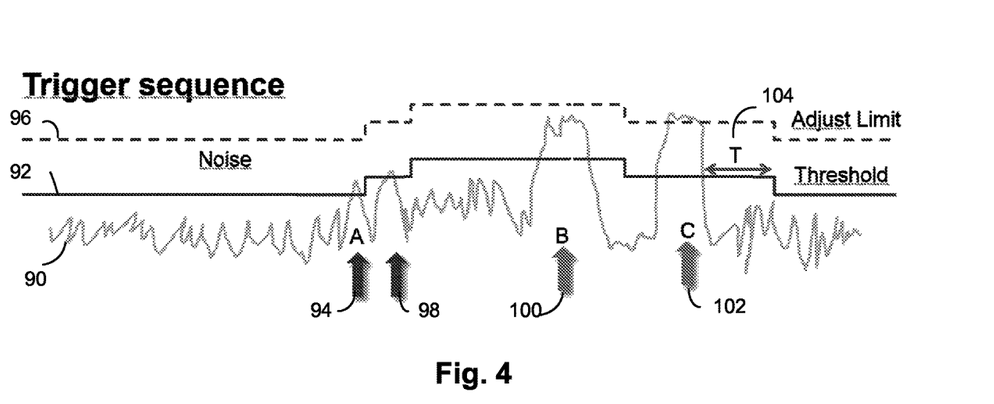
FIG. 4 is a trigger sequence illustrating a variable threshold for detecting words in accordance with the present disclosure.

Referring now to FIG. 4, dynamic adjustment of the threshold levels is shown graphically. More specifically, a received microphone signal 90 is shown over a period of time. Initially, the received microphone signal 90 is less than the sound threshold level 92 and thus no action is taken. This "idle" period corresponds to the looping that can occur between steps 62 and 64 in FIG. 3.

At a first region 94 the received microphone signal 90 exceeds the sound threshold level 92 and is less than the adjust limit threshold level 96, but upon initial analysis the received signal 90 is not found to contain speech. Thus, the sound threshold level 92 and adjust limit threshold level 96 are increased by a prescribed value. While the example illustrates adjustment after each detected event, it should be understood that adjustments may be withheld until a prescribed number of events have occurred. The adjustment of the sound threshold level corresponds to steps 64, 68 and 70 in FIG. 3. A purpose for increasing the thresholds is to minimize false triggers, thus conserving power. At region 98 the microphone signal 90 again exceeds the sound threshold level 92 and is less than the adjust limit threshold level 96, but after further analysis is again not found to include speech and therefore the sound threshold level 92 and adjust limit threshold level 96 are again increased by a prescribed value (to further minimize false triggers).

At region 100 the microphone signal 90 exceeds the sound threshold level 92 and is just below the adjust limit threshold level 96. Upon analysis the signal 90 in region 100 is believed to contain speech and further analysis of the signal may be performed to determine if the signal includes a word corresponding to a keyword. Further, since the signal 96 exceeded the sound threshold level, is believed to include speech, but did not exceed the adjust limit threshold level 96, the sound threshold level 92 and the adjust limit threshold level 96 are decreased given that the speech analysis detected a valid command. At region 102, the received microphone signal 90, which is believed to include speech, exceeds both the sound threshold level 92 and the adjust limit threshold level 96. Therefore, if the speech contained a valid command, the levels are properly set and no further adjustment is necessary at the present time. The adjustment of the threshold levels at regions 100 and 102 correspond to steps 68, 74, 76, 78, 80 and 82 in FIG. 3. If the signals at regions 100 and 102 do not contain a valid command, the signals should be interpreted as noise and a further increase of the sound threshold level 92 and adjust limit threshold level 96 can be performed, provided that the sound threshold level 92 and adjust limit threshold level 96 have not reached a pre-determined maximum value.

If a prescribed time period 104 has elapsed without the received microphone signal 90 exceeding both the sound threshold level 92 and the adjust limit threshold level 96, the sound threshold level 92 and the adjust limit threshold level 96 are decreased by a prescribed value. A purpose of decreasing the respective levels is to address a possible situation in which the sound threshold level 92 and/or the adjust limit threshold level 96 are set too high and thus valid speech is undetected.

Figure 5:
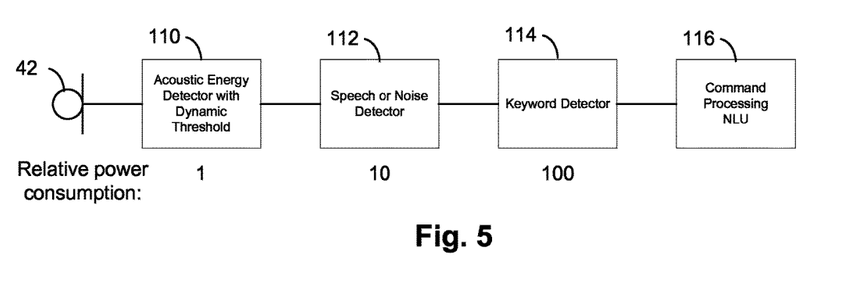
FIG. 5 is a block diagram illustrating modules of an electronic device in accordance with the present disclosure, and the relative power consumption of the respective modules.

Referring to FIG. 5, a block diagram is provided illustrating the various modules that may be used in the voice command detector in accordance with the present disclosure, and their relative power consumption ratings More specifically, a microphone 42 is operatively coupled to an acoustic energy detector module 110. In addition to receiving sound signals from the microphone, the Acoustic energy detector module 110 implements dynamic thresholding of the sound and adjust limit threshold levels. The acoustic energy detector module 110 is operatively coupled to a speech and noise detector module 112, which is configured to analyze the signals provided by the microphone 42 based on the dynamic sound and speech thresholds provided by the acoustic energy detection module 110. The speech or noise detector module 112 is operatively coupled to a keyword detector module 114, which determines if any detected speech includes a keyword. The keyword detector module 114 provides any detected keywords to a command processing natural language module 116, which carries out the commands (either directly or indirectly) corresponding to any detected keywords. As shown in FIG. 5, the relative power consumption level of the acoustic energy detector module is significantly less than that of the speed or noise detector module 112, which in turn has a relative power consumption that is significantly less than the keyword detector module 114. It is noted that the illustrated numbers are merely exemplary, and other relative power consumption relationships may exist depending on the particular application.

Accordingly, the apparatus and method in accordance with the present disclosure enable voice recognition functionality to be continuously active, without suffering significant power drain.

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
   audio circuitry for capturing ambient sound;
   voice command detection circuitry for determining voice commands provided by a user, the voice command detection circuitry configured to
   disregard, without analysing for the presence of speech, sound captured by the audio circuitry that does not exceed a first sound pressure threshold level;
   analyze sound captured by the audio circuitry that exceeds the first sound threshold level using a speech recognition algorithm for detecting the presence of words or ambient noise;
   dynamically adjust the first sound pressure threshold level based on the analysis of the captured sound;
   increase the first sound pressure threshold level when at least one of the captured sound is determined to be ambient noise or a word hit rate of the captured sound is below a first prescribed hit rate threshold; and
   decrease the first sound pressure threshold level when the captured sound includes speech having a word hit rate exceeding a second prescribed hit rate threshold or a prescribed time period has elapsed.

2. The device according to claim 1, wherein the voice command detection circuitry is configured to conclude the captured sound is ambient noise when a difference between at least one of the sound pressure level and phase of sound captured by a first microphone and the sound pressure level and phase of sound captured by a second microphone is less than a corresponding first prescribed threshold.

3. The device according to claim 1, wherein the audio circuitry comprises a first microphone arranged at one location of the electronic device, and a second microphone arranged at a different location of the electronic device, and wherein the voice command detection circuitry is configured to compare at least one of a sound pressure level and phase of sound captured by the first microphone with a corresponding at least one of a sound pressure level and phase of sound captured by the second microphone, and conclude the captured sound is user speech when a difference between the at least one of the sound pressure level and phase of sound captured by the first microphone and the corresponding at least one of the sound pressure level and phase of sound captured by the second microphone exceeds a corresponding second prescribed threshold.

4. The device according to claim 1, wherein the voice detection circuitry is configured to:
   increase the first sound pressure threshold level when the captured sound exceeds the first sound pressure threshold level and a percentage of noise within the captured sound exceeds a prescribed percentage of the total captured sound; and
   decrease the first sound pressure threshold level when at least one of i) a prescribed time period has elapsed or ii) the captured sound includes speech and is less than a second sound pressure threshold level, the second sound pressure threshold level greater than the first sound pressure threshold level.

5. The device according to claim 4, wherein when the first sound pressure threshold level is decreased under step ii, the voice detection circuitry is configured to maintain the first and second sound pressure threshold levels when the captured sound includes speech and exceeds the second sound pressure threshold level.

6. The device according to claim 1, wherein the voice detection circuitry is configured to adjust a second sound pressure threshold level in proportion to an adjustment made to the first sound pressure threshold level.

7. The device according to claim 1, where the voice command detection circuitry is configured to disregard the sound captured by the audio circuitry that does not exceed the first sound pressure threshold by performing no further processing based on the captured sound.

8. The device according to claim 1, wherein the first sound pressure threshold level comprises a sound amplitude.

9. The device according to claim 1, wherein the voice detection circuitry is configured to:
increase the first sound pressure threshold level when the captured sound exceeds the first sound pressure threshold level and a percentage of noise within the captured sound exceeds a prescribed percentage of the total captured sound; and
decrease the first sound pressure threshold level when the captured sound includes speech and is less than a second sound pressure threshold level, the second sound pressure threshold level greater than the first sound pressure threshold level.

10. A method for detecting voice commands, comprising:
using audio circuitry to capture sound;
disregarding, without analysing for the presence of speech, sound captured by the audio circuitry that does not exceed a first sound pressure threshold level,
analyzing sound captured by the audio circuitry that exceeds the first sound pressure threshold level using a speech recognition algorithm for detecting the presence of words or ambient noise in the captured sound;
dynamically adjusting the first sound pressure threshold level based on the analysis of the captured sound;
increasing the first sound pressure threshold level when at least one of the captured sound is determined to be ambient noise or a word hit rate of the captured sound is below a first prescribed hit rate threshold; and
decreasing the first sound pressure threshold level when the captured sound includes speech having a word hit exceeding a second prescribed hit rate threshold or a prescribed time period has elapsed.

11. The method according to claim 10, where dynamically adjusting the first sound pressure threshold level comprises:
increasing the first sound pressure threshold level when the captured sound exceeds the first sound pressure threshold level and a percentage of noise within the captured sound exceeds a prescribed percentage of the total captured sound; and
decreasing the first sound pressure threshold level when at least one of i) a prescribed time period has elapsed or ii) the captured sound includes speech and is less than a second sound pressure threshold level, the second sound pressure threshold level greater than the first sound pressure threshold level.

12. The method according to claim 11, wherein decreasing the first sound pressure threshold level under step ii includes maintaining the first and second sound pressure threshold levels when the captured sound includes speech and exceeds the second sound pressure threshold level.

13. The method according to claim 10, wherein analyzing the captured sound includes using the captured sound in a speech recognition method to determine the presence of speech.

14. The method according to claim 10, further comprising concluding the captured sound is ambient noise when a difference between the at least one of the sound pressure level and phase of sound captured by a first microphone and the corresponding at least one of the sound pressure level and phase of sound captured by a second microphone is less than a corresponding first prescribed value.

15. The method according to claim 10, wherein the audio circuitry comprises a first microphone arranged at one location of an electronic device, and a second microphone arranged at a different location of the electronic device, and wherein analyzing the captured sound includes comparing at least one of a sound pressure level and phase of sound captured by the first microphone with a corresponding at least one of the sound pressure level and phase of sound captured by the second microphone, and concluding the captured sound is user speech when a difference between the at least one of the sound pressure level and phase captured by the first microphone and a corresponding at least one of the sound pressure level and phase of sound captured by the second microphone is greater than a corresponding second prescribed threshold.

16. The method according to claim 10, further comprising adjusting a second sound pressure threshold level in proportion to an adjustment made to the first sound pressure threshold level.

17. The method according to claim 10, wherein disregarding includes performing no further processing based on the captured sound.

18. The method according to claim 10, wherein the first sound pressure threshold level comprises a sound amplitude.

* * * * *